(12) United States Patent
Bell

(10) Patent No.: US 8,973,343 B2
(45) Date of Patent: Mar. 10, 2015

(54) MOWER DECK TRIMMER ASSEMBLY

(71) Applicant: Frank Bell, Pottersville, MO (US)

(72) Inventor: Frank Bell, Pottersville, MO (US)

( * ) Notice: Subject to any disclaimer, the term of this patent is extended or adjusted under 35 U.S.C. 154(b) by 0 days.

(21) Appl. No.: 14/105,448

(22) Filed: Dec. 13, 2013

(65) Prior Publication Data

US 2014/0202128 A1    Jul. 24, 2014

Related U.S. Application Data

(60) Provisional application No. 61/753,978, filed on Jan. 18, 2013.

(51) Int. Cl.
| A01D 34/00 | (2006.01) |
| A01D 34/66 | (2006.01) |
| A01D 34/74 | (2006.01) |
| A01D 34/76 | (2006.01) |
| A01D 34/82 | (2006.01) |
| A01D 43/16 | (2006.01) |

(52) U.S. Cl.
CPC ............... *A01D 34/66* (2013.01); *A01D 34/74* (2013.01); *A01D 34/76* (2013.01); *A01D 34/824* (2013.01); *A01D 43/16* (2013.01)
USPC ............................................ 56/13.7; 56/12.7

(58) Field of Classification Search
USPC ............. 56/10.4, 12.7, 13.5–13.8, 14.9, 15.7, 56/16.9, 251
See application file for complete search history.

(56) References Cited

U.S. PATENT DOCUMENTS

| 4,120,136 | A | * | 10/1978 | Rose | 56/17.1 |
| 5,040,360 | A | * | 8/1991 | Meehleder | 56/11.6 |
| 5,167,108 | A | | 12/1992 | Bird | |
| 5,226,284 | A | * | 7/1993 | Meehleder | 56/11.6 |
| 5,598,689 | A | | 2/1997 | Bork | |
| 6,343,461 | B1 | | 2/2002 | Knott | |
| 6,415,586 | B1 | * | 7/2002 | Park | 56/12.7 |
| 6,430,906 | B1 | | 8/2002 | Eddy | |
| 6,546,706 | B1 | * | 4/2003 | Nafziger | 56/13.7 |
| 6,779,325 | B1 | | 8/2004 | Robillard | |
| 6,786,030 | B2 | * | 9/2004 | Nafziger | 56/12.7 |
| 6,966,168 | B1 | | 11/2005 | Kerr, Sr. | |
| 7,398,637 | B1 | | 7/2008 | Sevey | |
| 7,549,278 | B2 | * | 6/2009 | McMahan | 56/13.7 |
| 2003/0200662 | A1 | * | 10/2003 | Moore | 30/276 |

* cited by examiner

*Primary Examiner* — Alicia Torres
(74) *Attorney, Agent, or Firm* — Daniel Boudwin; Global Intellectual Property Agency LLC

(57) ABSTRACT

A trimmer assembly for attachment onto the mower deck of a riding mower. The assembly comprises an L-shaped attachment and a height adjustment assembly. The L-shaped attachment is connected to the trim blade spindle of a riding mower, and comprises a pulley surface and a downwardly extending trim shaft holding surface. A series of pulleys within the L-shaped attachment are connected together by a trimmer drive belt that facilitates the movement of the trimmer shaft when the trim blade spindle rotates. The height adjustment comprises an upstanding shaft with a lever attached thereon. The lever is pivotally attached onto the top of the upstanding shaft, and comprises a foot actuatable handle, whereby the movement of the handle alters the height of the L-shaped attachment. The device further includes a pair of wheels that enable side-to-side movement, and a spring loaded mount that provides protection against damages from impacts.

9 Claims, 7 Drawing Sheets

MOWER DECK TRIMMER ASSEMBLY

CROSS REFERENCE TO RELATED APPLICATION

Figure 1:
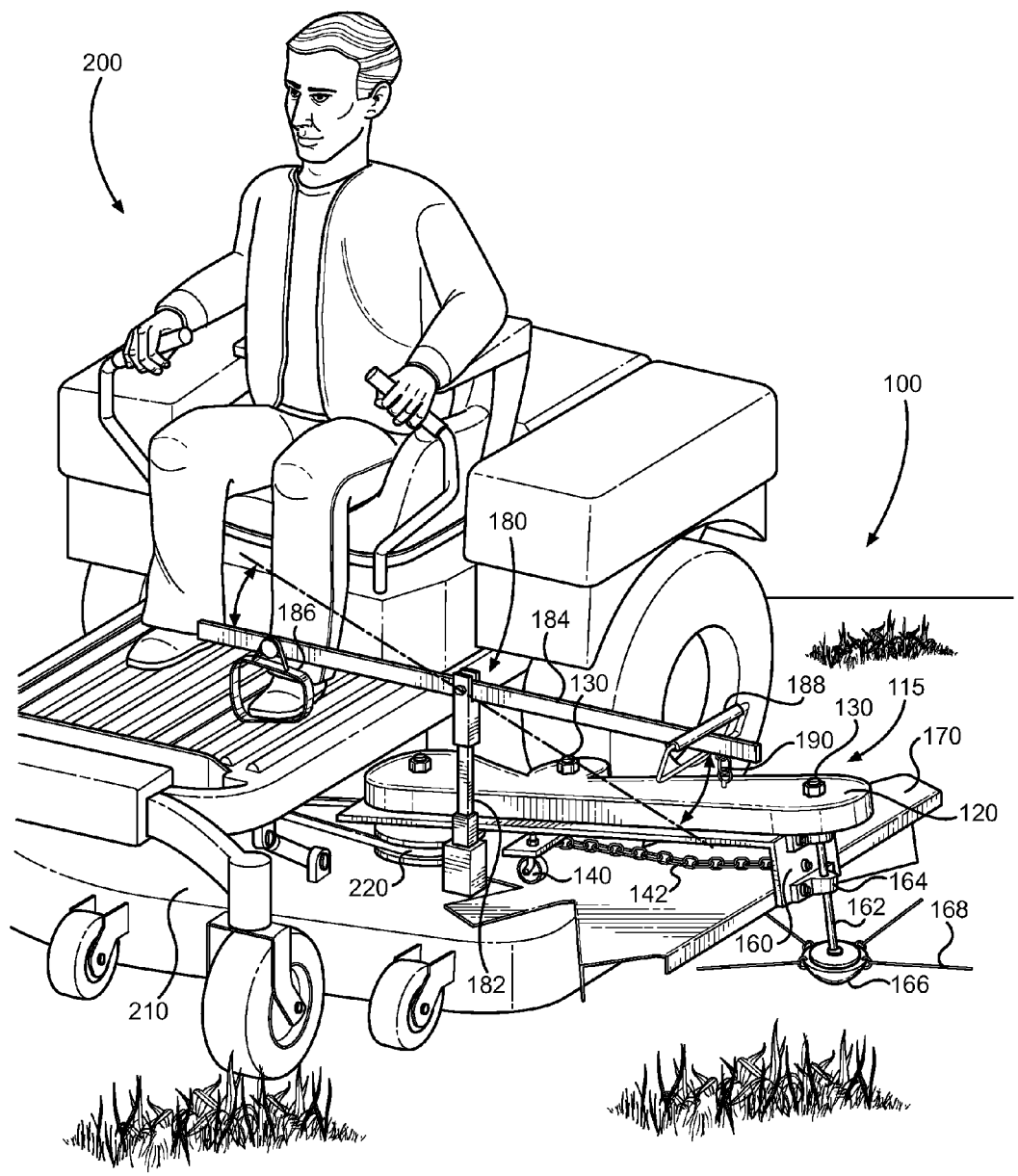

This application claims the benefit of U.S. Provisional Application No. 61/743,978 filed on Jan. 18, 2013, entitled "Onboard Weed Trimmer." The above identified patent application is herein incorporated by reference in its entirety to provide continuity of disclosure.

BACKGROUND OF THE INVENTION

1. Field of the Invention

The present invention relates to trimmers. More specifically the invention relates to a trimmer that is configured for attachment onto a motorized lawn mower.

A trimmer (e.g. weed wacker, weed trimmer) is a powered device for cutting down unwanted grass and other plants that reside near objects that are not easily accessed by lawn mowers, such as near fences, trees, or the sides of buildings. Trimmers are typically operated while being held by the user. The downside of these trimmers is that they are often bulky and heavy. A traditional trimmer includes a proximal end having a power source or a plug that attaches to the source, a long shaft extending therefrom, and a rotatable head comprising a thin line. The organization of the sections of the trimmer create an uneven weight distribution, thus leading to user fatigue.

A variety of adjustments and attachments have been developed in order to assist a user in supporting a trimmer when landscaping a lawn. The most popular attachment to a trimmer is to add wheels to the trimmer that enable a user to push the device instead of having them hold the trimmer. The process of adding wheels to the device may be convenient for its own uses, however, the addition has drawbacks. A manually pushed trimmer must still attach to a power source, thereby limiting its range of use. Also, the trimming of larger yards is a time consuming task.

There are devices of the prior art that attempt to overcome the drawbacks associated with traditional trimmer modifications. These devices provide a trimmer attachment onto a riding lawnmower. These devices typically attach onto the side of a mower deck, thereby eliminating the need to physically carry the device. Also, some of these devices are powered by the mower deck, which enables use of the device as long as the lawn mower is running. These solutions, however, are not universally adaptable, as not all mower decks are of an equal height, therefore the solutions must be tailored to individual mowers.

The present invention provides a trimmer assembly for attachment onto the deck of a riding lawnmower. The assembly comprises an L-shaped attachment having a series of pulleys, and a height adjusting assembly for changing the height of the L-shaped attachment. The L-shaped attachment is powered by the trim blade spindle of a riding mower, thereby enabling use of the device over large areas without causing user fatigue. The height adjusting attachment comprises a foot actuated attachment at the end of the lever, whereby a vertical movement of the trimmer attachment is achieved when a user manipulates the lever. The present invention enables a person to use a weed trimmer in conjunction with a riding mower, reduces the strain, fatigue and discomfort of carrying a handheld weed trimmer, and eliminates the need to push a motorized weed trimmer.

2. Description of the Prior Art

Devices have been disclosed in the prior art that relate to trimmer assemblies. These include devices that have been patented and published in patent application publications. These devices generally relate to trimmers configured for attachment onto lawnmowers. The following is a list of devices deemed most relevant to the present disclosure, which are herein described for the purposes of highlighting and differentiating the unique aspects of the present invention, and further highlighting the drawbacks existing in the prior art.

Devices of the prior art largely relate to trimmers that are configured for attachment onto riding lawnmowers. These mowers may be powered by the mower, and may comprise a line or a blade that cuts through grass, weeds, and other vegetation. However, while useful for their own purposes, the prior art devices fail to anticipate the trimmer assembly of the present invention. The present invention however, provides a trimmer assembly configured for attachment onto a mower deck of a riding lawnmower, whereby the assembly comprises a height adjustment mechanism and a spring mechanism that is capable of absorbing impacts while riding on the mower.

On such device, U.S. Pat. No. 5,167,108 to Bird provides a lawn mower trimmer attachment that is pivotally attached to the mower deck, whereby the attachment is positioned adjacent to a side edge of the deck to enable the trimmer to access areas that are not within reach of the mower blades. The attachment further comprises a spring that enables rotational deformation of the device when the device comes into contact with an immovable object, whereafter the spring force rotates the trimmer to its original position. While the device of Bird is similar in nature and relevant to the present invention, it differs in that it fails to provide a trimmer assembly that includes a height adjuster.

Another device, U.S. Pat. No. 6,343,461 to Knott provides a telescopingly adjustable lawn trimmer attachment, whereby the device is configured for attachment onto riding lawn mowers. The device is mounted on the underside of the mower deck and is supplied power therefrom by belts that are operably connected to the engine of the lawn mower. Although the device of Knott teaches a lawn trimmer attachment, the device fails to provide a height adjustable trimmer assembly as presented by the present invention.

U.S. Pat. No. 6,966,168 to Kerr provides a trimmer caddie for a mower deck, whereby the trimmer caddie is removably mounted to a post having a spring that allows the trimmer caddie to pivot forward and backward during use. The device provides the attachment of traditional trimmers, and enables the trimmers to move about a post. The device, however, fails to provide a height adjusting lever as presented by the present invention.

Yet another device, U.S. Pat. No. 7,398,637 to Sevey discloses an accessory mounting system for a riding lawn mower, wherein the system is configured for mounting a lawn trimmer thereon. The mounting system allows for the vertical movement of the attached trimmer, however, the system differs from the present invention in that it fails to provide a trimmer attachment that is connected to, and powered by the blade spindle of the lawn mower.

Another such device, U.S. Pat. No. 6,439,906 to Eddy discloses a mower attachment device for trimming weed and other vegetation. The device is powered by a riding lawn-mower, and includes a pulley system and a guard to protect a user from the trimmer line. Although the device provides a trimmer attachment that is similar in nature and relevant to the present invention, the device, however, fails to provide a height adjustment mechanism.

U.S. Pat. No. 6,779,325 to Robillard teaches an edging and trimming assembly for use with a lawn mower. The assembly comprises a gear train that is operably connected and powered by the lawn mower. While the device comprises a trimming assembly similar to that of the present invention, it fails to provide a user actuated height adjustment mechanism that enables the user to determine whether or not the trimmer contacts weeds and grass.

Finally, U.S. Pat. No. 5,598,689 to Bork teaches a trim mower attachment for riding mowers, whereby the trimmer is connected to the riding mower blade, and is powered therefrom. The device is capable of pivoting freely upward and downward, and is capable of quickly releasing from the mower deck. The device, however, fails to provide a spring mechanism that allows for the movement and recovery of the device when contacted by an immovable object.

The present invention provides a trimmer assembly for attachment onto the mower deck of a riding mower. The assembly comprises two parts. The first part is an L-shaped attachment and the second part is a height adjustment attachment. The L-shaped attachment is made of a first and second section, whereby the first section comprises a pulley surface and the second is a downward extending trimmer shaft holding surface. The L-shaped surface is bolted onto to the trim blade spindle of a riding mower, whereby the spindle supplies power to the trimmer assembly. A series of three pulleys within the L-shaped attachment are connected together by a trimmer drive belt that facilitates the movement of a trimmer shaft when the trim blade spindle rotates. The first pulley is a drive pulley that is secured onto the trim blade spindle, the second pulley is an idler, and the third actuates the rotation of the trimmer line shaft. The height adjustment attachment comprises an upstanding shaft that is secured onto the mower deck. A lever is pivotally mounted on the top of the height adjustment shaft, whereby the lever is secured onto the shaft midway along the length of the lever. The lever comprises a foot actuated handle that is positioned near the user. A downward actuation of the handle causes the opposing lever end to raise up. The opposing lever end is connectable onto a chain and handle of the pulley surface, thereby raising the L-shaped attachment with actuation of the lever.

It substantially diverges in design elements from the prior art and consequently it is clear that there is a need in the art for an improvement to existing trimmer assemblies configured for attachment onto riding lawnmowers. In this regard the instant invention substantially fulfills these needs.

SUMMARY OF THE INVENTION

In view of the foregoing disadvantages inherent in the known types of attachable trimmer assemblies now present in the prior art, the present invention provides a new device wherein the same can be utilized for providing convenience for the user when an attachment onto a riding lawn mower is desired, thereby enabling ease of use.

It is therefore an object of the present invention to provide a new and improved attachable trimmer assembly that has all of the advantages of the prior art and none of the disadvantages.

It is another object of the present invention to provide a trimmer assembly that is bolted onto the trimmer blade spindle of a lawnmower, whereby the assembly is powered by the spindle.

Another object of the present invention is to provide an attachable trimmer assembly that comprises a height adjustment mechanism, whereby the mechanism is actuated by the foot of a user.

Yet another object of the present invention is to provide an attachable trimmer assembly comprising a pulley system that transfers movement to the trimmer shaft.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 1 displays a perspective view of the present invention in use.

Figure 2:
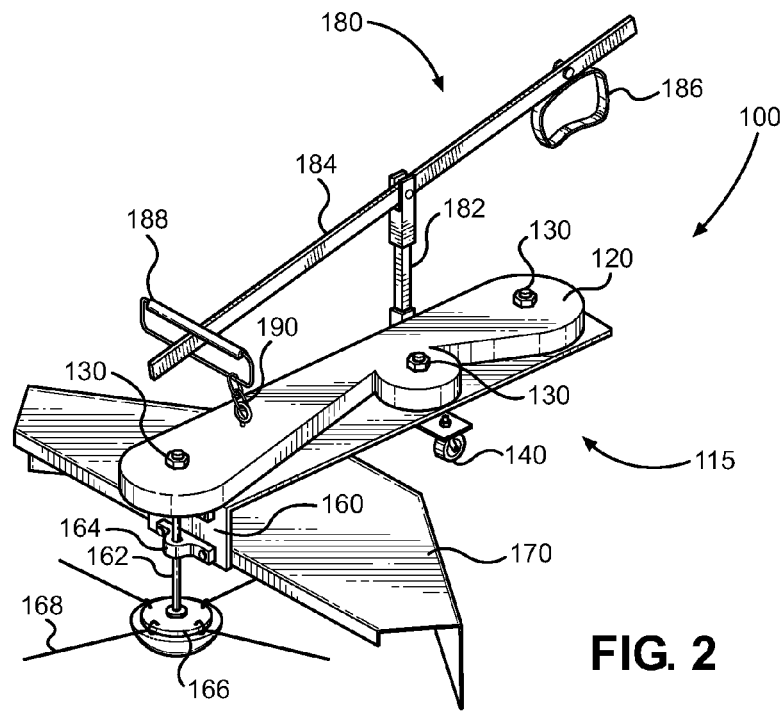

FIG. 2 displays a perspective view of the trimmer assembly of the present invention.

Figure 3:
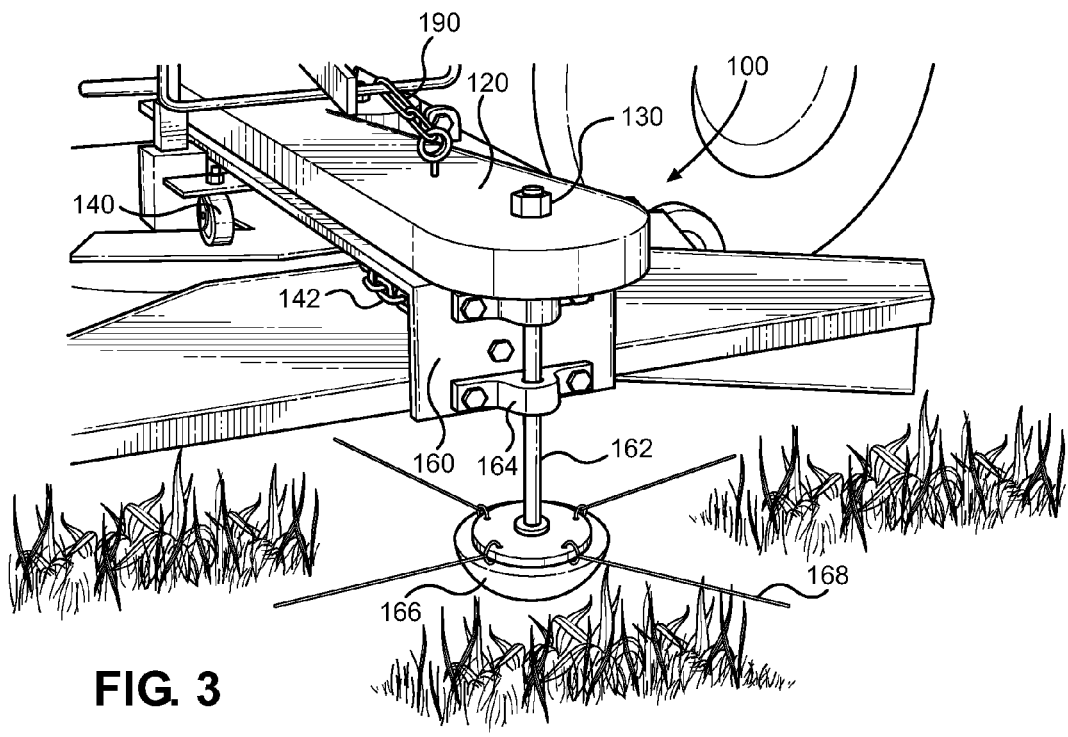

FIG. 3 displays a close up view of the trimmer shaft surface of the present invention.

Figure 4:
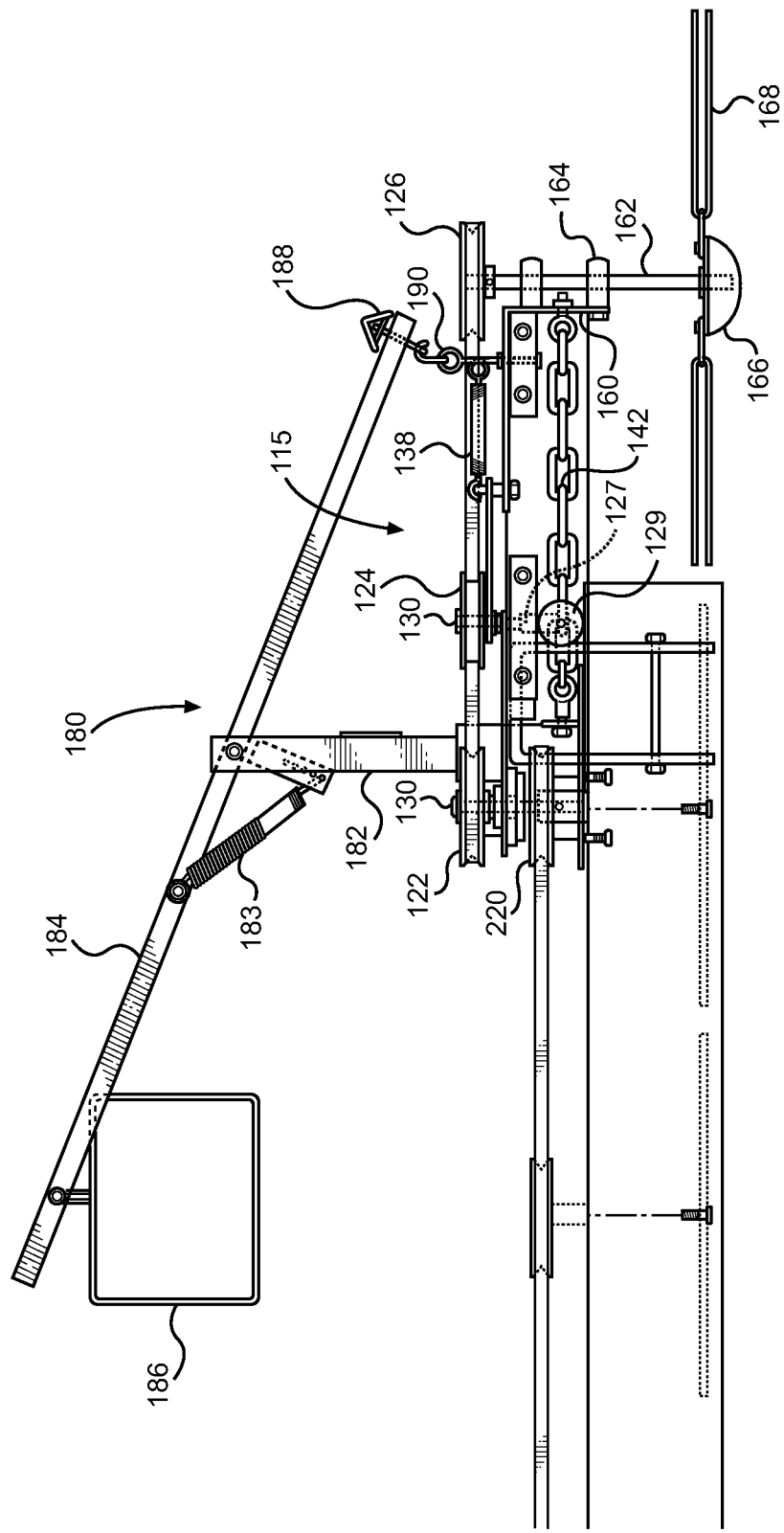

FIG. 4 displays a side view of the internal mechanisms of the trimmer assembly of the present invention.

Figure 5:
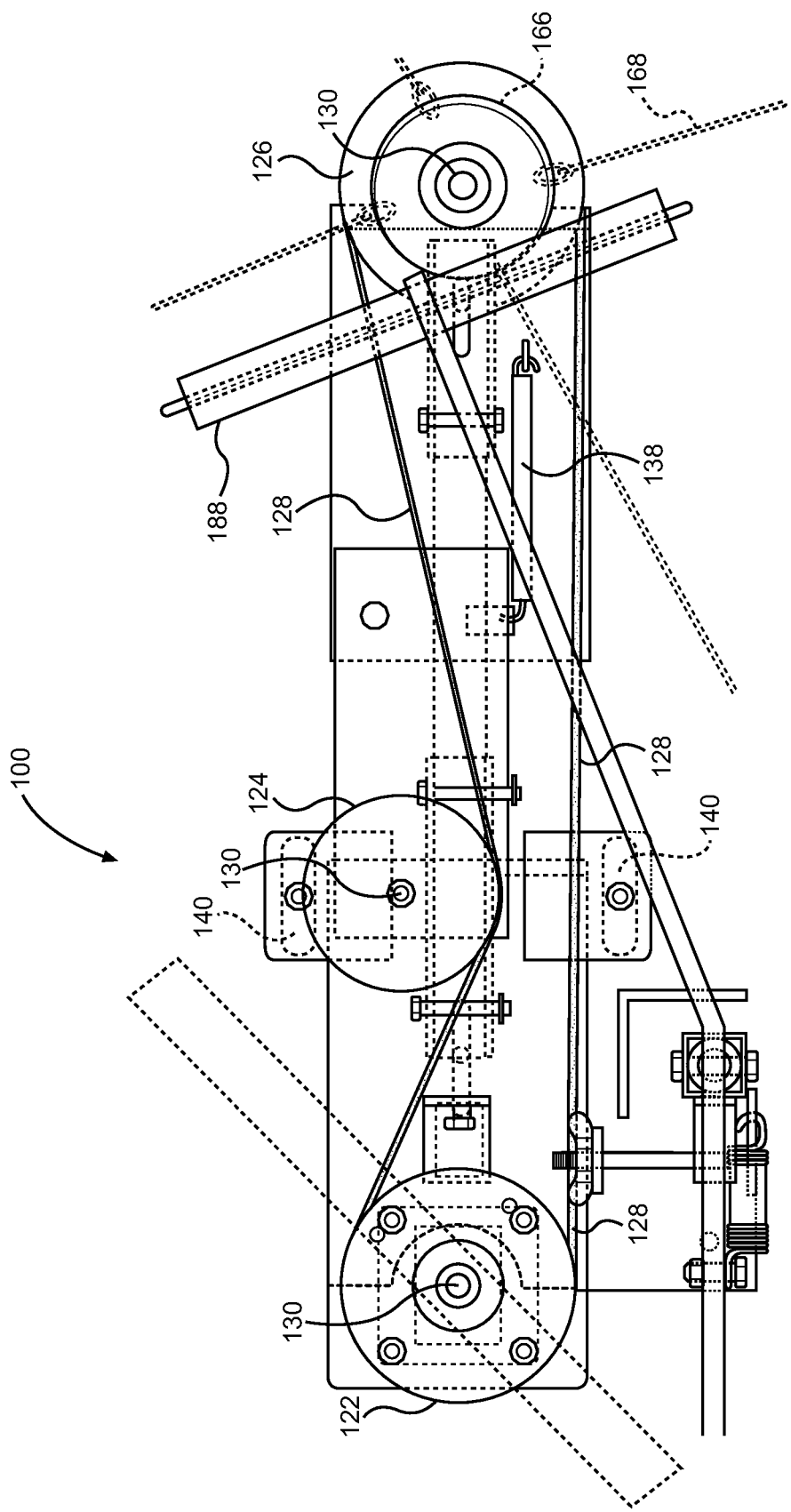

FIG. 5 displays an overhead view of the internal mechanisms of the trimmer assembly.

Figure 6:
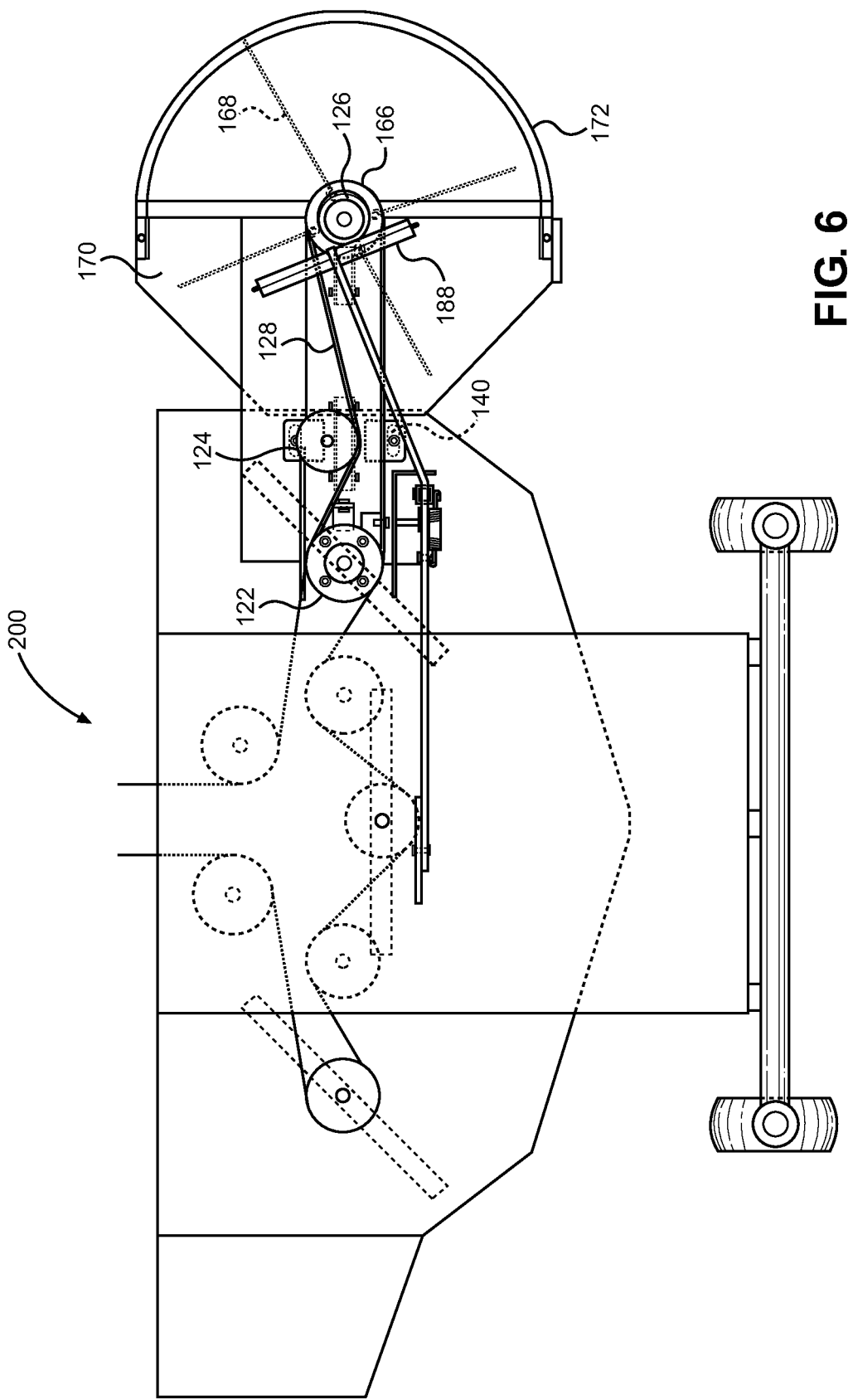

FIG. 6 displays an overhead view of the trimmer assembly with a guidance loop.

Figure 7:
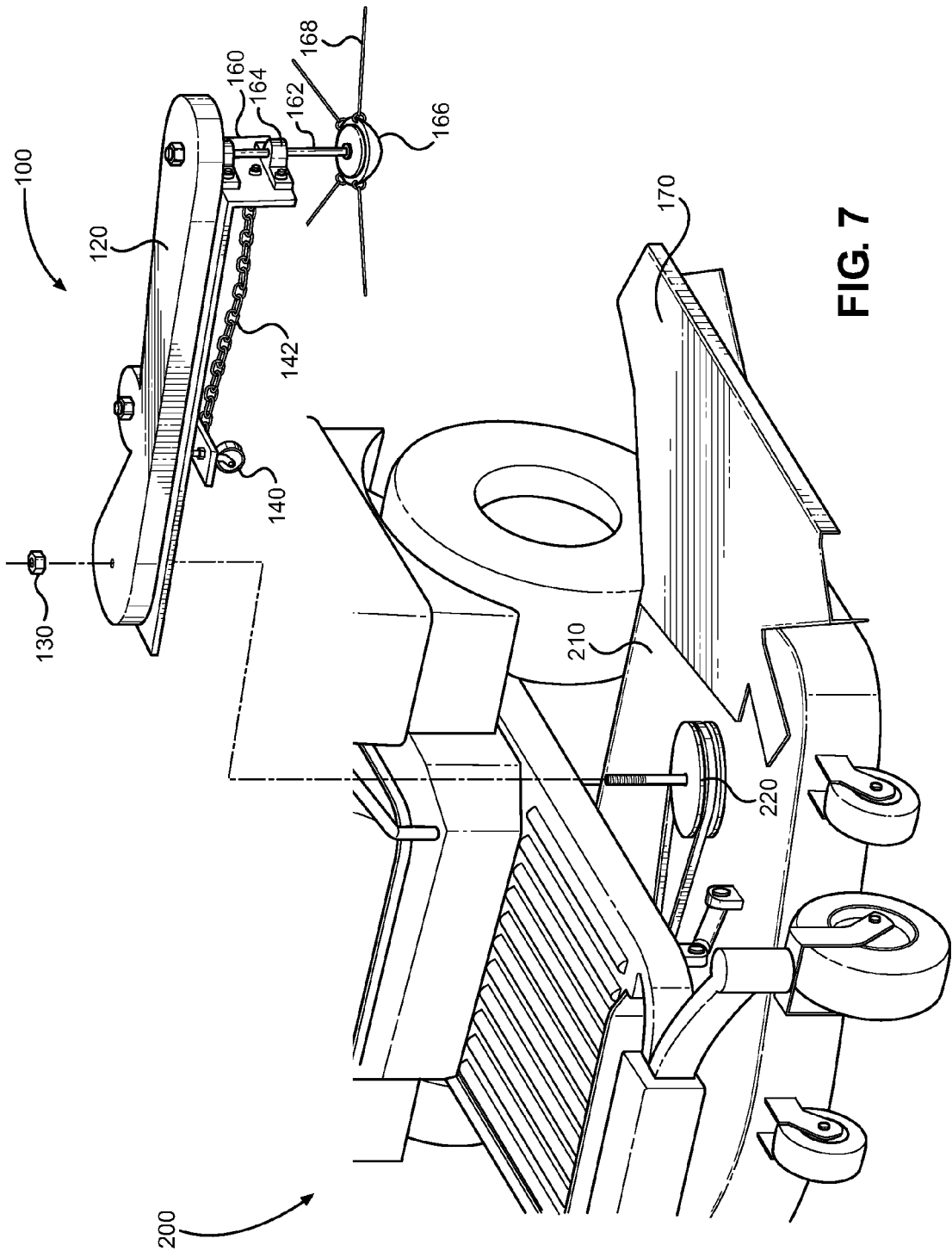

FIG. 7 displays the connection between the trimmer assembly and a mower deck.

Figure 8:
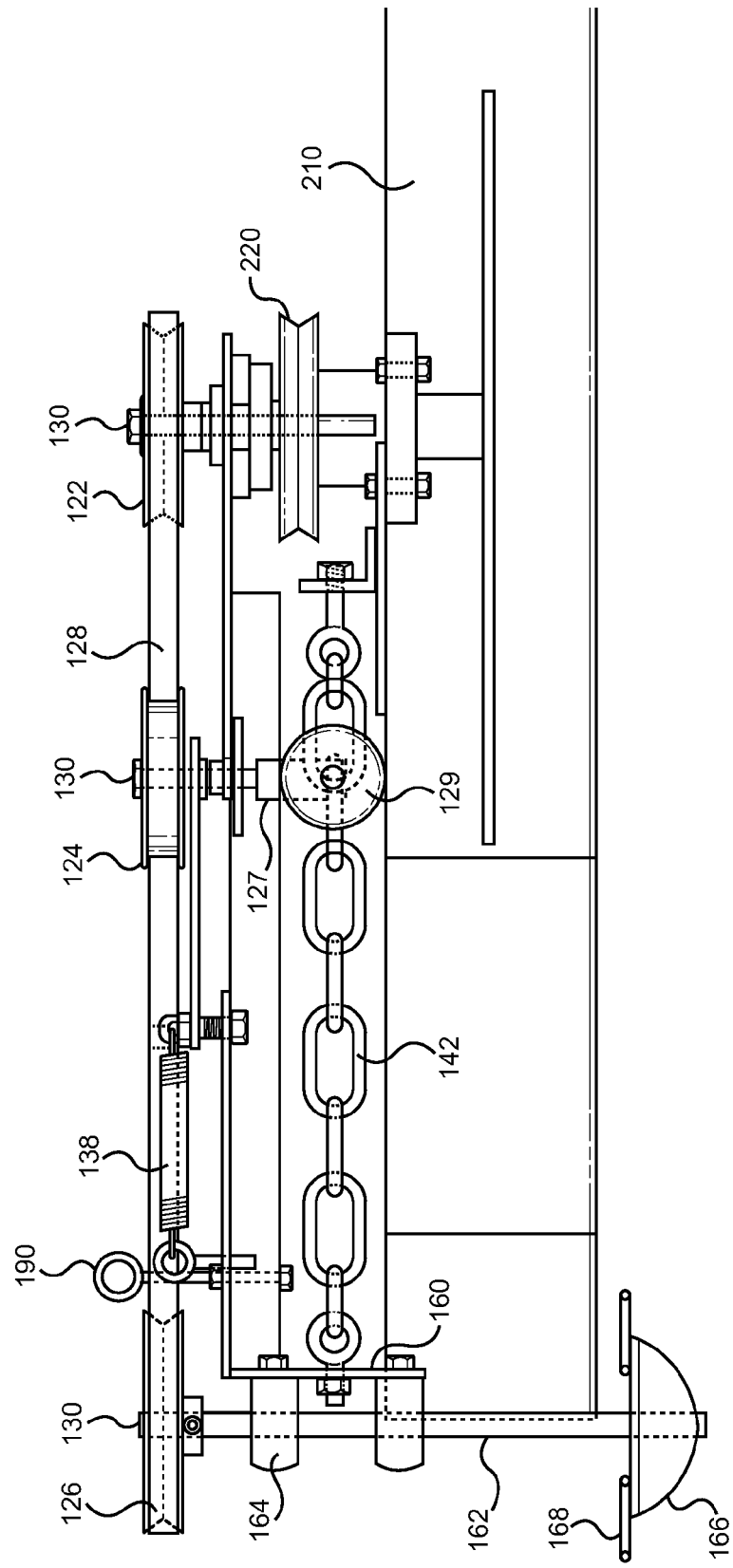

FIG. 8 displays a cross-sectional view of the trimmer on the mower deck.

DETAILED DESCRIPTION OF THE INVENTION

Reference is made herein to the attached drawings. Like reference numerals are used throughout the drawings to depict like or similar elements of the attachable trimmer assembly. For the purposes of presenting a brief and clear description of the present invention, the preferred embodiment will be discussed as used for attachment onto the mower deck of a riding lawnmower. The figures are intended for representative purposes only and should not be considered to be limiting in any respect.

Referring now to FIG. 1, there is shown a perspective view of the trimmer attachment assembly 100 in use, whereby the assembly 100 is configured for attachment onto a side of the mower deck 210 of a riding lawnmower 200. The assembly 100 comprises an L-shaped attachment 115 and a height adjuster 180 that is configured for raising and lowering the L-shaped attachment 115, thereby enabling the trimmer assembly 100 to avoid contact with certain objects, such as rocks and desirable vegetation.

The L-shaped attachment 115 of the trimmer assembly 100 is comprised of two sections. The first section is an elongated pulley surface 120 that has a series of pulleys therein, which are configured for providing rotation to the trimmer line 168. The pulleys comprise a drive pulley secured to the trim blade spindle 220, an idler pulley, and an actuation pulley, whereby the pulleys are connected together by a drive belt. The drive pulley is secured to the trim blade spindle 220 of the mower deck 210. Operation of the lawn mower results in the rotation of the trim blade spindle 220 of the mower deck 210, thus resulting in the rotation of the drive pulley. The series of pulleys are configured to provide rotation to a trimmer shaft 162 when the lawnmower is running, thereby eliminating the requirement of needing a power source separate from the mower 200.

Referring now to FIG. 2 there is shown a perspective view of the L-shaped attachment 115 and the height adjusting attachment 180 of the trimmer assembly 100. The height adjusting attachment 180 is configured to alter the vertical height of the L-shaped attachment 115. The height adjuster is comprised of an upstanding shaft 182 and a lever 184, whereby the lever 184 is pivotally secured on top of the upstanding shaft 182. The lever 184 extends lengthwise along the side of the mower deck 210 from an area near the user to a position near the actuation pulley 126 (see FIGS. 4 and 5) of the L-shaped attachment 115. The end of the lever 184 nearest the user comprises a foot actuator 186 that resembles a stirrup-like foot receiving handle. The opposing lever end nearest the actuation pulley is adapted for connection to the pulley surface 120. The pulley surface 120 has chain 190 that extends from the surface 120, whereby the chain 190 comprises a distal lever connecting handle 188. The lever-connecting handle 188 is looped around the end of the lever 184, thereby providing a connection between the L-shaped attachment 115 and the height adjuster 180. When a user's foot is inserted within the actuator 186, a downward movement by the foot of a user results in the rising of the opposing end of the lever 184. The lever end and lever attachment 188 are lifted upward, thereby resulting in the lifting of the trimmer shaft supporting surface end 160 of the L-shaped attachment 115.

Referring now to FIG. 3, there is shown a close-up view of the second section of the L-shaped attachment 115. The second section is a trimmer shaft supporting surface 160 that projects downward from the distal end of the pulley surface 120, whereby the shaft supporting surface 160 extends from beneath the actuation pulley. The shaft supporting surface 160 supports a trimmer shaft 162 that is connected to the actuation pulley. The trimmer shaft surface 160 includes a pair of vertically separated pillow block bearings 164 and a shroud 170. The pillow block bearings 164 are sized to receive the trimmer shaft 162. The pillow block bearings 164 are further sized to allow for the vertical displacement and rotation of the shaft 162 within the bearings 164, whereby a rotation of the actuation pulley is transferred to the trimmer shaft 162. To further protect the vegetation, the trimmer head 166 comprises a rounded half-moon shape in order to provide some distance between the trimmer line 168 and the ground, thereby preventing the trimmer line 168 from cutting the vegetation too low.

Referring now to FIGS. 4 and 5 there are shown an overhead and outlined view of the internal mechanisms of the pulley surface 120. The pulley surface 120 is configured to attach onto the trim blade spindle 220, thereby transferring rotation to the pulleys within the pulley surface 120. The pulley surface 120 comprises a drive pulley 122, an idler pulley 124 to maintain tension, and an actuation pulley 126. The drive pulley 122 is bolted 130 onto the trim blade spindle of the mower deck (see 210, FIG. 1). Rotation of the spindle during operation of the mower facilitates the rotation of the drive pulley 122. A drive belt 128 operably connects each of the pulleys 122, 124, and 126. The belt 128 wraps around the outer surfaces of the drive 122 and actuation 126 pulleys, thereby connecting each of the pulleys to the trim blade spindle of the mower. The idler pulley 124 is positioned between the drive pulley 122 and the actuation pulley 126. The idler 124 is positioned to maintain the tension of the drive belt 128 between the drive 122 and actuation 126 pulleys, thereby providing continuous rotation of the pulleys 122, 124, 126 with the rotation of trim blade spindle (220, FIG. 1).

The idler pulley 124, is further configured to maintain tension during impacts to the trimmer assembly 100. During use of the trimmer assembly 100 there may be collisions with buildings and trees when attempting to trim near barriers. The pulley surface 120 comprises a spring loaded mount 138 that is configured to flex and shorten the distance of the pulley surface 120 when impacted by an object from the outside environment. The flexing of the mount 138 prevents excessive damage to the assembly 100 and returns the pulley surface 120 to its original length after the impact. The idler pulley 124 is configured to maintain the tension of the drive belt 128 during the impacts. The drive belt 128 remains in connection with the set of pulleys 122, 124, 126, thereby continuously facilitating the rotation of the pulleys and prevents the tangling or disconnection of the drive belt during use.

Referring again to FIG. 4, the height adjusting attachment 180 of the trimmer assembly is adapted to raise the height of the L-shaped attachment 115. The height adjusting attachment 180 comprises an upstanding shaft 182 and a lever 184 that is pivotally attached to the upper surface of the shaft 182. A spring bias 183 may further connect the shaft 182 to the lever 184, whereby the spring 183 biases the lever 184 to maintain the trimmer line 168 in a position that is capable of trimming vegetation. Additionally, the idler pulley 124 can comprise a connecting rod 127 extending therethrough, whereby the connecting rod 127 comprises a wheel 129 thereon. Whereas the wheels on the sides of the assembly (140, see FIG. 1) are adapted for providing movements during angular impacts, the wheel 129 enables movement of the trimmer assembly during frontal impacts.

Referring now to FIG. 6, there is shown a view of trimmer assembly in use, whereby the assembly comprises an attached guidance loop. The guidance loop 172 is bolted onto the protective shroud 170, and is configured to indicate the lengthwise limits of the spinning trimmer line 168 when the mower 200 is in use. The guidance loop 172 serves as a visual barrier of the limits of the trimmer line 168, thereby providing a visual mechanism that reduces the likelihood that a user would trim down desirable vegetation.

Referring now to FIGS. 7 and 8, there are shown views of the connection between the mower deck 210 and the trimmer assembly 100, and a connected cross-sectional view of the assembly on the mower deck, respectively. The trimmer assembly 100 is configured to be removably attached to the deck 210 of a mower 200 by bolting onto the trim blade spindle of the mower deck. The drive pulley 122 is mountable onto the trim blade spindle 220 and bolted thereon 130, whereby rotation of the trim blade spindle 220 results in the rotation of the drive pulley. Actuation of the drive pulley 122, by rotation of the trim blade spindle 220, is transferred to the idler pulley 124 and the trimmer shaft actuation pulley 126 by a drive belt 128 that operably connects the three pulleys together. The assembly 100 is further mounted onto the mower deck 210 by a chain 142. The chain 142 is bolted to the trimmer shaft supporting surface 160 at one end, and to the mower deck 210 at the opposing end of the chain 142 in order to provide an additional securing feature.

Although the assembly 100 is secured by a chain 142 and by bolting onto the trim blade spindle 220, the assembly 100 is configured to permit limited movement in relation to the mower deck 210. A spring loaded mount 138 allows for the lengthwise shortening of the pulley surface 120 when the trimmer assembly 100 contacts an immovable object of the outside environment, thereby lessening the chances of possible damage to the assembly 100. A set of wheels 140 on the assembly 100 enable the assembly to pivot from side to side when the trimmer assembly 100 comes into contact with an object from an angle, whereas the wheel 129 enables the assembly to move backward during frontal impacts.

The present invention provides a trimmer assembly 100 that is configured for attachment on the deck 210 of a riding lawnmower 200. The assembly comprises an L-shaped attachment 115 and a height adjusting attachment 180. The L-shaped attachment 115 includes a pulley surface 120 and a trimmer shaft supporting surface 160. The pulley surface 120 comprises a drive pulley 122, an idler pulley 124 and an actuation pulley 126, whereby the pulleys are operably connected together by a drive belt 128. The drive pulley 122 is bolted to the trim blade spindle 220 of the mower deck 210. Operation of the lawnmower 200 rotates the mower spindle 220 and the bolted drive pulley 122. The drive belt 128 transfers the rotation of the drive pulley 128 to the idler 124 and actuation pulley 126, thereby providing an operable connection between each of the pulleys and the trim blade spindle 220 when the mower is running.

The height adjusting attachment 180 comprises an lever 184 that is pivotally attached on top of an upstanding shaft 182. The lever comprises a foot actuation handle 186 at a proximal end nearest the user. The opposing end is connectable to the pulley surface 122 by a lever handle 188. Actuation of the foot handle 186 causes the lever to pivot downwards and raise the assembly 100 a few inches from the ground, thereby providing the user a way to raise the trimmer head 166 over rocks and other objects that might wear down the trimmer line 168. The trimmer assembly 100 comprises a spring loaded mount 138 that enables the pulley surface 120 to decrease in length when contacting immovable objects that are capable of damaging the device. Moreover, if the trimmer assembly 100 comes into contact with objects from an angle, the assembly 100 comprises a pair of wheels 140 that enable the L-shaped attachment 115 to move a short distances from side to side, thereby limiting the damages that may be caused by coming into contact with immovable objects.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A trimmer for attachment onto the mower deck of a riding mower, comprising:
    a rigid L-shaped assembly; and a height adjustment assembly;
    said L-shaped assembly having first and second surfaces, whereby said first surface is a long-pulley surface and said second surface is a downward trimmer shaft supporting surface;
    wherein said long-pulley surface comprises a series of pulleys connected together by a trimmer drive belt;
    said pulleys comprise a drive pulley, an idler pulley, and an actuation pulley, whereby movement of said pulleys rotates a trimmer shaft that is connected to said actuation pulley;
    said trimmer shaft comprising a trimmer head and a trimmer line, whereby said trimmer line is attached to said trimmer head;
    said height adjustment assembly comprising an upstanding shaft and a lever;
    wherein said lever comprises a first end and a second end, said second end secured to said L-shaped assembly;
    said upstanding shaft, is rigidly secured on said mower deck and said lever is pivotally attached on top of said upstanding shaft, whereby actuation of said lever is adapted to vertically adjust the height of said trimmer head above the ground.

2. The mower deck trimmer of claim 1, wherein said drive pulley is secured to a trim blade spindle of a mower deck, whereby rotation of said trim blade spindle results in the rotation of said pulleys and said trimmer shaft.

3. The mower deck trimmer of claim 1, whereby said pulley surface comprises a pair of wheels that enable movement when said trimmer contacts outside objects.

4. The mower deck trimmer of claim 1, whereby said trimmer head is half-moon shaped.

5. The mower deck trimmer of claim 1, whereby said L-shaped assembly comprises a spring loaded mount configured to absorb impacts on said assembly.

6. The mower deck trimmer of claim 1, whereby said height adjustment assembly comprises a foot actuated handle disposed on said lever, and wherein said foot actuated handle comprises a stirrup.

7. The mower deck trimmer of claim 1, wherein said L-shaped assembly comprises a pair of side wheels, whereby said side wheels are adapted to enable said L-shaped assembly to pivot from side to side.

8. The mower deck trimmer of claim 1, wherein said L-shaped assembly comprises a wheel, wherein said wheel is in contact with a surface of said mower deck, and whereby said wheel is adapted to enable forward and backward movement of said L-shaped assembly.

9. The mower deck trimmer of claim 1, wherein said lever comprises a foot actuated stirrup on a first end thereof, and is connected to said L-shaped assembly at a second end thereof.

* * * * *